US009116592B2

(12) United States Patent
Kuronuma

(10) Patent No.: US 9,116,592 B2
(45) Date of Patent: Aug. 25, 2015

(54) DATA PROCESSING DEVICE FOR PROCESSING INPUT DATA TO BE USED FOR PRINTING, PRINTER INCLUDING THE PROCESSING DEVICE, AND NON-TRANSITORY COMPUTER READABLE RECORDING MEDIUM STORING A DATA PROCESSING PROGRAM

(71) Applicant: CASIO COMPUTER CO., LTD., Shibuya-ku, Tokyo (JP)

(72) Inventor: Hirotaka Kuronuma, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/216,943

(22) Filed: Mar. 17, 2014

(65) Prior Publication Data
US 2014/0285827 A1 Sep. 25, 2014

(30) Foreign Application Priority Data

Mar. 19, 2013 (JP) .................................. 2013-055897
Mar. 17, 2014 (JP) .................................. 2014-053919

(51) Int. Cl.
*H04N 1/00* (2006.01)
*G06F 3/048* (2013.01)
*B41J 3/407* (2006.01)

(52) U.S. Cl.
CPC ............... *G06F 3/048* (2013.01); *B41J 3/4075* (2013.01)

(58) Field of Classification Search
CPC .................. G06F 3/04883; G06F 3/04886
USPC .................................................. 358/1.1–3.29
See application file for complete search history.

(56) References Cited

U.S. PATENT DOCUMENTS

| 5,038,218 A | 8/1991 | Matsumoto |
| 8,098,408 B2 | 1/2012 | Sawada et al. |
| 2013/0070261 A1* | 3/2013 | Kimura .......................... 358/1.2 |

FOREIGN PATENT DOCUMENTS

| JP | 06-076036 A | 3/1994 |
| JP | 07-114548 A | 5/1995 |
| JP | 07-314802 A | 12/1995 |
| JP | 08-030592 A | 2/1996 |
| JP | 09-044490 A | 2/1997 |
| JP | 2000-289285 A | 10/2000 |
| JP | 2006-099261 A | 4/2006 |
| JP | 2008-080588 A | 4/2008 |
| JP | 2009-178850 A | 8/2009 |
| JP | 2011-062985 A | 3/2011 |
| JP | 2011-143648 A | 7/2011 |

* cited by examiner

*Primary Examiner* — Marcellus Augustin
(74) *Attorney, Agent, or Firm* — Holtz, Holtz, Goodman & Chick PC

(57) ABSTRACT

A data processing device includes an input unit including an input detection region, a detection unit, a partition region setting unit, a valid region setting unit, a longitudinal direction determination unit and a magnification determination unit. The detection unit detects input to the input detection region. The partition region setting unit partitions the input detection region into partition regions. The valid region setting unit sets, among said partitioned partition regions, a partition region in which input is detected as a valid region. The longitudinal direction determination unit determines a longitudinal direction of the valid region. The magnification determination unit determines a magnification for enlarging or reducing a size of a drawing corresponding to the input in the valid region, so that a width along a direction perpendicular to the longitudinal direction of the valid region conforms to a width along a transverse direction of a printing medium.

9 Claims, 10 Drawing Sheets

FIG. 9

押印してください

DATA PROCESSING DEVICE FOR PROCESSING INPUT DATA TO BE USED FOR PRINTING, PRINTER INCLUDING THE PROCESSING DEVICE, AND NON-TRANSITORY COMPUTER READABLE RECORDING MEDIUM STORING A DATA PROCESSING PROGRAM

CROSS-REFERENCE TO RELATED APPLICATION

This application claims priority based on Japanese Patent Application No. 2013-055897, filed on Mar. 19, 2013, the entire contents of which are incorporated by reference herein. This application also claims priority based on Japanese Patent Application No. 2014-053919 filed on Mar. 17, 2014.

BACKGROUND OF THE INVENTION

1. Field of the Invention

The present invention relates to a data processing device that processes input data in order to use the input data for printing, a printer including the processing device, and a computer readable recording medium storing a data processing program.

2. Description of the Related Art

There are printers that set a tape cassette therein which accommodates a tape member resulting from laminating a printing tape, including a printing face on the surface thereof and a rear surface serving as an adhesive face, and a peeling tape attached to the adhesive face and that perform printing based on desired data on the printing tape of the tape member to thereby create a label. In this case, desired data may be data that is input from an input device such as a keyboard further included in the printer, or may be data such as characters, figures, or images which are generated in an external device.

For example, JP-A-2011-62985 discloses a printer including cutting setting means that sets a cutting position in a tape member on the basis of an input operation position on a touch panel in a printing image of character data displayed on a preview screen and sets the type of cutting for the tape member to any one of full cutting or half cutting on the basis of a diagram that is input by handwriting.

In the printer disclosed in the above-described publication, in a case of data input for label printing being written horizontally, when a large margin portion having no data input thereto is present above and below the label printing data within a drawing input detection region, the entirety including the margin is set as the label printing data. Thus, there is a problem in that a margin is generated above and below a printing part when the data is printed on the tape member and the printing part becomes smaller, which results in difficulty in seeing the printing part.

BRIEF SUMMARY OF THE INVENTION

A data processing device includes an input unit, a detection unit, a partition region setting unit, a valid region setting unit, a longitudinal direction determination unit and a magnification determination unit. The input unit includes an input detection region. The detection unit detects a position of input to the input detection region of the input unit. The partition region setting unit partitions the input detection region of the input unit into one or more partition regions. The valid region setting unit sets, among said one or more partition regions partitioned by the partition region setting unit, a partition region in which input is detected as a valid region. The longitudinal direction determination unit determines a longitudinal direction of the valid region. The magnification determination unit determines a magnification for enlarging or reducing a size of a drawing corresponding to the input in the valid region, the magnification such that a width along a direction perpendicular to the longitudinal direction of the valid region conforms to a width along a transverse direction of a printing medium.

A printer includes an input unit, a detection unit, a partition region setting unit, a valid region setting unit, a longitudinal direction determination unit, a magnification determination unit and a printer unit. The input unit includes an input detection region. The detection unit detects a position of input to the input detection region of the input unit. The partition region setting unit partitions the input detection region of the input unit into one or more partition regions. The valid region setting unit sets, among one or more partition regions partitioned by the partition region setting unit, a partition region in which input is detected as a valid region. The longitudinal direction determination unit determines a longitudinal direction of the valid region. The magnification determination unit determines a magnification for enlarging or reducing a size of a drawing corresponding to the input in the valid region, the magnification such that a width along a direction perpendicular to the longitudinal direction of the valid region conforms to a width along a transverse direction of a printing medium. The printer unit prints, on the printing medium, the drawing which is enlarged or reduced in size in accordance with the magnification.

A non-transitory computer readable medium stores a data processing program to execute data processing. The data processing program is a program for controlling a data input device that includes an input unit having an input detection region and a detection unit detecting a position of input to the input detection region of the input unit. The data processing including: partitioning the input detection region of the input unit into one or more partition regions; setting, among said one or more partition regions, a partition region in which input is detected as a valid region; determining a longitudinal direction of the valid region; and determining a magnification for enlarging or reducing a size of a drawing corresponding to the input in the valid region, the magnification such that a width along a direction perpendicular to the longitudinal direction of the valid region conforms to a width along a transverse direction of a printing medium.

BRIEF DESCRIPTION OF THE DRAWINGS

FIG. 9 illustrates an example in which labels are created in the printer according to the first embodiment of the present invention.

DETAILED DESCRIPTION OF THE INVENTION

Figure 1:
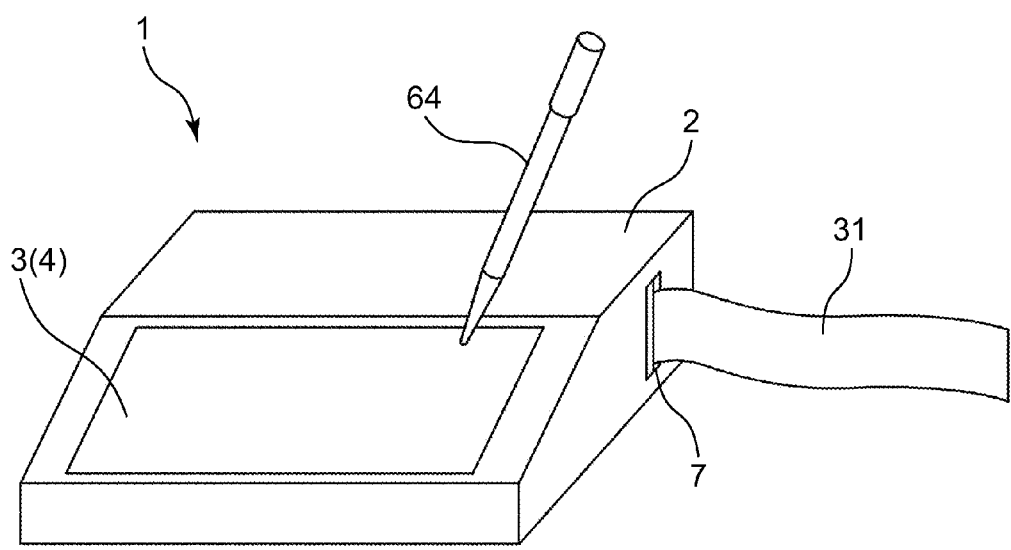
FIG. 1 is a perspective view illustrating a contour of a printer according to a first embodiment of the present invention.
Figure 2:
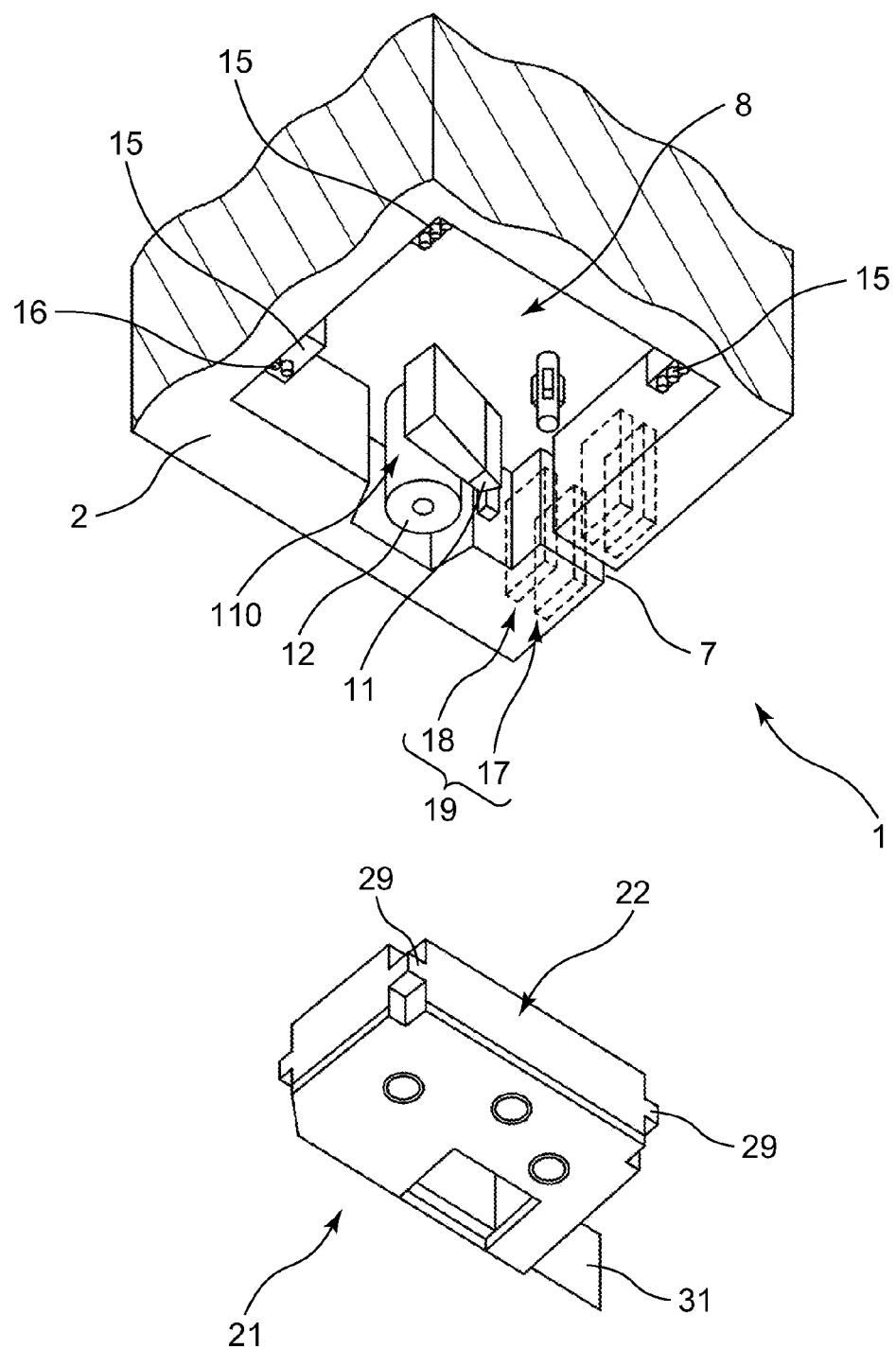
FIG. 2 is an enlarged view of the inside of the printer according to the first embodiment of the present invention and a perspective view of a tape cassette.

Hereinafter, embodiments of the present invention will be described in detail with reference to the accompanying drawings. FIG. 1 is a perspective view illustrating a contour of a printer 1 according to a first embodiment of the present invention. FIG. 2 is a perspective view illustrating a contour of a tape cassette 21 used in the printer 1 and illustrating a portion of an internal structure of the printer 1. The printer 1 is an apparatus that prints characters, figures, images, and the like on a tape member 31 (printing medium) formed by laminating a printing tape, including a printing face on the surface thereof and a rear surface serving as an adhesive face, and a peeling tape attached to the adhesive face.

As illustrated in FIG. 1, the printer 1 has an input unit 4, constituted by a rectangular touch panel, on a top surface of a housing 2 thereof. The printer is configured to have an inclination in such a manner that the front side thereof is low in height and the back side thereof is high in height in order to facilitate handwriting input using a touch pen 64. In addition, the input unit has a rectangular shape in which a horizontal direction and a vertical direction are a longitudinal direction and a transverse direction, respectively, when seen from the front side thereof.

Specifically, as illustrated in FIG. 1, the printer 1 includes, on the top surface of the housing 2, a display unit 3 that displays a menu of modes or displays a virtual keyboard using a software keyboard function and is constituted by a liquid crystal display device. In addition, the input unit 4 serving as a character input device, which is a transparent pressurizing switch, is disposed, in an overlapping manner, on a top surface of a display screen of the liquid crystal display device which is the display unit 3.

As illustrated in FIG. 2, a cassette loading portion 8 for loading the tape cassette 21 accommodating the tape member 31 is formed inside an opening and closing lid that is prepared in a back face of the printer in order to load the tape cassette 21. The cassette loading portion 8 is provided with a printer unit 110 and cassette reception portions 15. The printer unit includes an ink-jet type printing head 11, having nozzles ejecting ink of Y (yellow), M (magenta), and C (cyan) colors, and a transfer roller 12. The cassette reception portions support the tape cassette 21 at a predetermined position.

In addition, a tape feeding unit 7 leading to the outside of the housing 2 is formed in one end of the cassette loading portion 8. The tape feeding unit 7 is embedded with a cutting mechanism 19 constituted by a full cutting mechanism 17 serving as first cutting means, cutting the printing tape and the peeling tape of the tape member 31 along a width direction, and a half cutting mechanism 18 serving as second cutting means cutting only the printing tape of the tape member 31. Meanwhile, the cutting mechanism 19 may include only the full cutting mechanism, but no half cutting mechanism.

Further, the tape cassette 21 includes a cassette case 22, and the tape member 31 is wound inside the cassette case 22.

In addition, a to-be-engaged portion 29, engaged with the cassette reception portion 15 of the cassette loading portion 8 and supported by the cassette reception portion 15, is formed in a corner portion of the cassette case 22. Although not shown in the drawing, predetermined irregularities according to the type of the tape cassette 21 are formed in the to-be-engaged portion 29 of the cassette case 22. In addition, the cassette reception portion 15 of the cassette loading portion 8 is provided with tape width detection switches 16 that determine irregularities formed in the to-be-engaged portion 29 of the cassette case 22 at the time of the loading of the tape cassette 21.

In the printer 1, when the cassette case 22 is loaded into the cassette loading portion 8, the to-be-engaged portion 29 of the cassette case 22 is engaged with some or all of the tape width detection switches formed in the cassette reception portion 15 of the cassette loading portion 8, and the engaged tape width detection switches 16 are pressed, and thus it is possible to determine a type of the width or the like of the tape member 31 by a combination of the tape width detection switches 16 that are set to be in an ON state.

Thus, the printer 1 is configured such that, depending on the determined type of the width or the like of the tape member 31, a control unit 40 can create printing data that is appropriate for the width or the like.

In the printer 1, when an instruction to perform printing is given, the tape member 31 is unreeled from the tape cassette 21. Then, by ink-jet type printing head 11 as printing means, the ink of each colors are sprayed from the nozzles of the ink-jet type printing head 11 that eject ink of Y (yellow), M (magenta), C (cyan) colors, respectively, thereby performing printing on the printing tape. When the printing is terminated, the full cutting mechanism 17 or the half cutting mechanism 18 operates, and thus the tape member 31 is cut off in the width direction, thereby creating one label.

Figure 3:
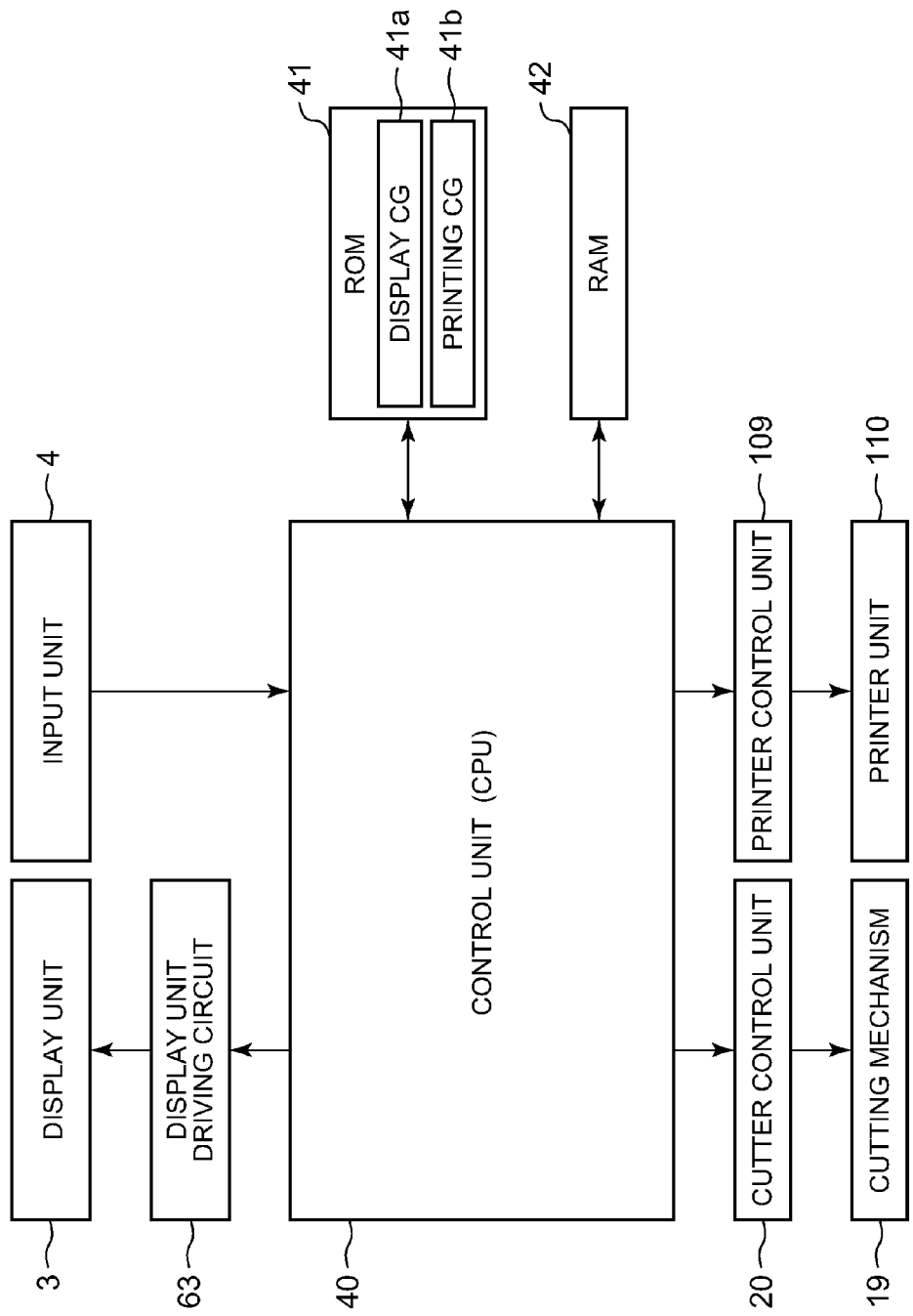
FIG. 3 is a functional block diagram of the printer according to the first embodiment of the present invention.

Next, a circuit configuration of the printer 1 will be described. As illustrated in FIG. 3, the printer 1 includes the control unit 40. Storage units such as a ROM 41 and a RAM 42 are connected to the control unit 40. In addition, the input unit 4 is connected to the control unit 40, and the display unit 3 can be controlled by the control unit 40 through a display unit driving circuit 63 which is a display control unit.

The control unit 40, which is a CPU, controls the operation of the respective units of the circuit by using the RAM 42 as a work memory, on the basis of a key input from the input unit 4 or on the basis of a system program stored in advance in the ROM 41, a control program stored in a memory card, a control program read from an external device, and the like.

A printer control unit 109 and a cutter control unit 20 are connected to the control unit 40. The printer control unit drives the printer unit 110 that includes a head driving circuit, driving the printing head 11 for printing, and a step motor driving circuit that drives a step motor transferring a tape. The cutter control unit drives the cutting mechanism 19 that is constituted by a cutter motor cutting off the tape.

In addition, the ROM 41 functions as a recording medium that readably stores, by the control unit 40, a program for displaying and printing character string data and the like used for printing, a printing font, a diagonal line and mesh used for filling, dot patterns, and the like.

The ROM 41 includes a display character generator (CG) 41a that stores pattern data having a font for display. In addition, the ROM 41 includes a printing character generator (CG) 41b that stores pattern data for printing.

The RAM 42 serves as a storage unit that secures a printing data memory region, a display data memory region, and the like. The printing data memory region stores pattern data in which character string data used for printing is expanded. The display data memory region stores pattern data to be displayed on the display unit 3. In addition, the RAM 42 is provided with a register, a counter, and the like. The register temporarily stores data necessary for a printing process.

In the printer 1, the control unit 40 controls the printer control unit 109 and the cutter control unit 20 to drive the printer unit 110 and the cutting mechanism 19, and thus data used for printing of characters or the like is printed on the tape member 31 and the tape member is appropriately cut off, and thus a label can be created.

The input unit 4 includes an icon display unit 66 that is provided along a right side, a drawing input detection region 65 which is a large portion other than the icon display unit 66, and division line position detection regions 56 to 59 that are provided along four sides of the drawing input detection region 65.

Figure 4:
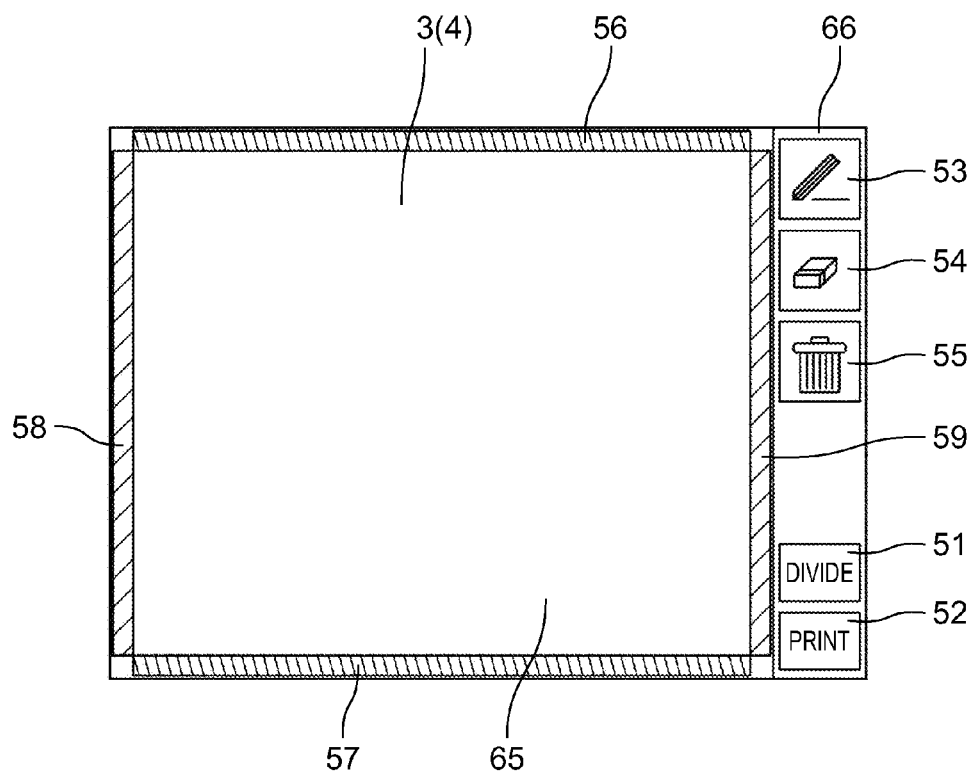
FIG. 4 is an explanatory diagram of icons of a display unit of the printer according to the first embodiment of the present invention.

As illustrated in FIG. 4, in a drawing mode for inputting character string data and the like used for printing, the control unit 40 displays, on the icon display unit 66, a drawing pencil icon 53, an eraser icon 54 for erasing drawing, and a trash box icon 55 for deleting all the current input contents. In the drawing mode, a user can touch the icons to perform drawing and editing of data for label creation on the input unit 4. In addition, in the drawing mode, the control unit simultaneously displays a division icon 51 for causing an operation mode to transition to the division mode and a printing icon 52 for causing the operation mode to transition to a printing mode.

When a user performs a handwriting input using the touch pen 64, the control unit 40 detects a touch input position using the touch pen 64 to color-display the touch position, and displays characters, figures, and the like on the drawing input detection region 65 of the input unit 4 in association with the movement of the touch pen 64.

The division line position detection regions 56 to 59 are rectangular regions in which a direction parallel to the sides of the drawing input detection region 65 is set to a longitudinal direction and a direction perpendicular to the sides thereof is set to a transverse direction.

The control unit 40 functions as a detection unit that detects an input position of data input to the input unit 4, and controls the display unit driving circuit 63 on the basis of the data input to the input unit 4 to perform various displays on the display unit 3.

When the division icon 51 is touched by a user, the control unit 40 changes a mode from an operation mode to a division mode that allows input of a division designation line which is performed by the user.

Figure 5:
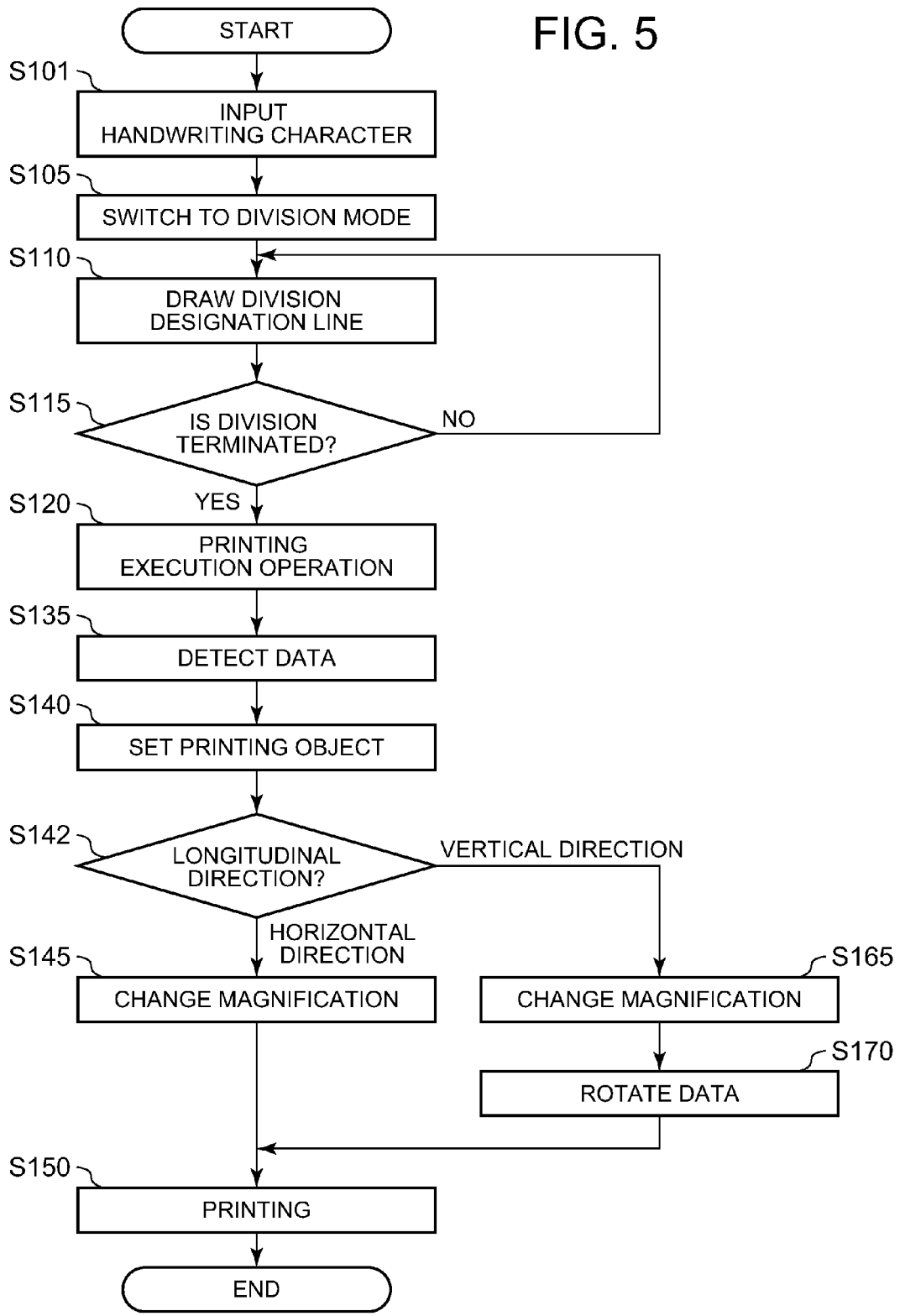
FIG. 5 is a flow chart illustrating a flow of label creation of the printer according to the first embodiment of the present invention.

Here, a description will be given in detail of a flow chart regarding a flow in which a label is created by the printer 1 according to the first embodiment of the present invention. FIG. 5 is a flow chart illustrating a flow of label creation using the printer 1 according to the first embodiment of the present invention.

Figure 6:
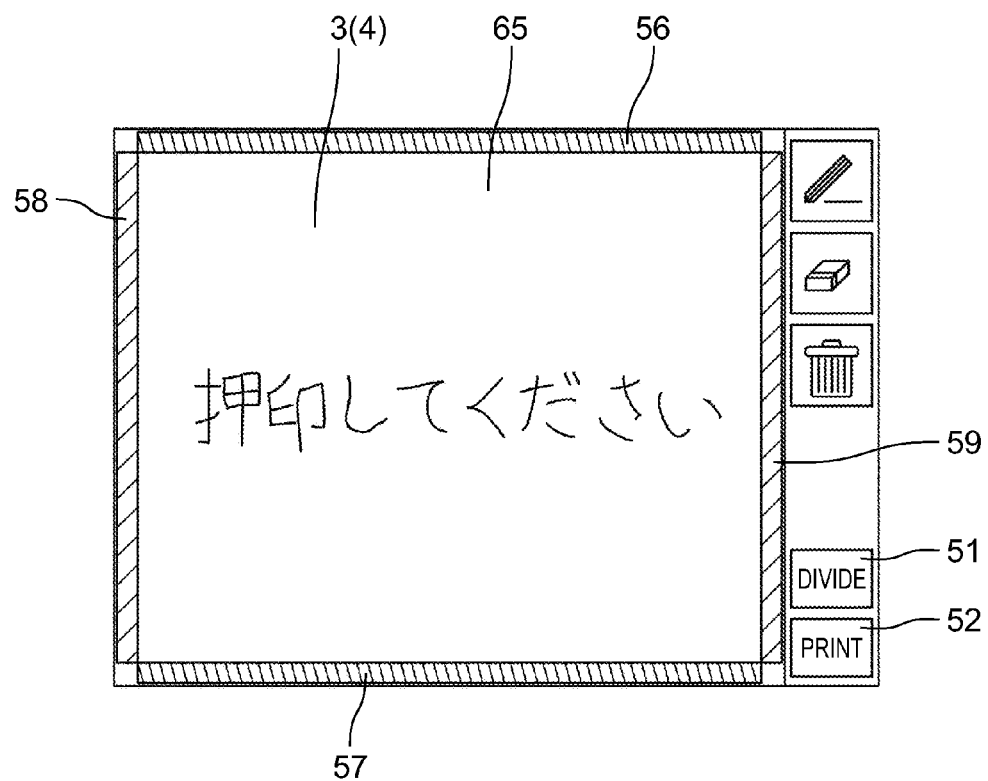
FIG. 6 illustrates an example in which label characters of cross-wise writing are input by handwriting in the printer according to the first embodiment of the present invention.

As illustrated in FIG. 6, the control unit 40 is set to be in a drawing mode and executes an input process (step S101) when characters of "please stamp" of a label to be created are input on the input unit 4 by handwriting. Additionally, the Japanese characters of "押印してください" in FIG. 6 indicated "please stamp" in English.

Figure 7A:
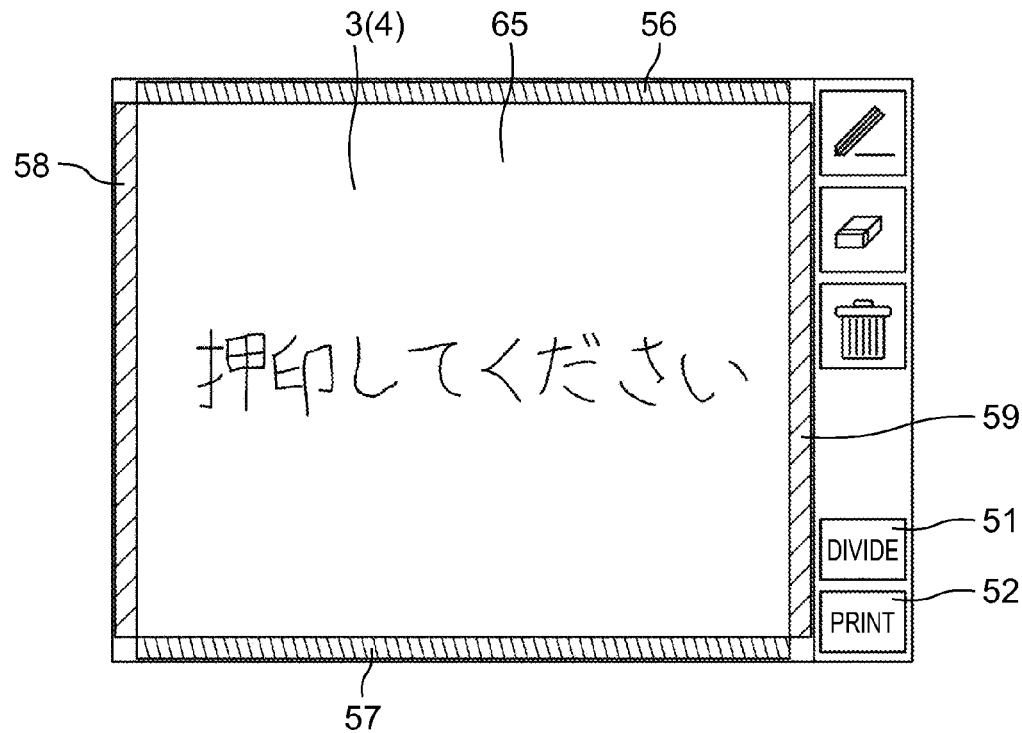
FIGS. 7A and 7B illustrate an example in which label characters of cross-wise writing and lengthwise writing are input by handwriting in the printer according to the first embodiment of the present invention.
Figure 7B:
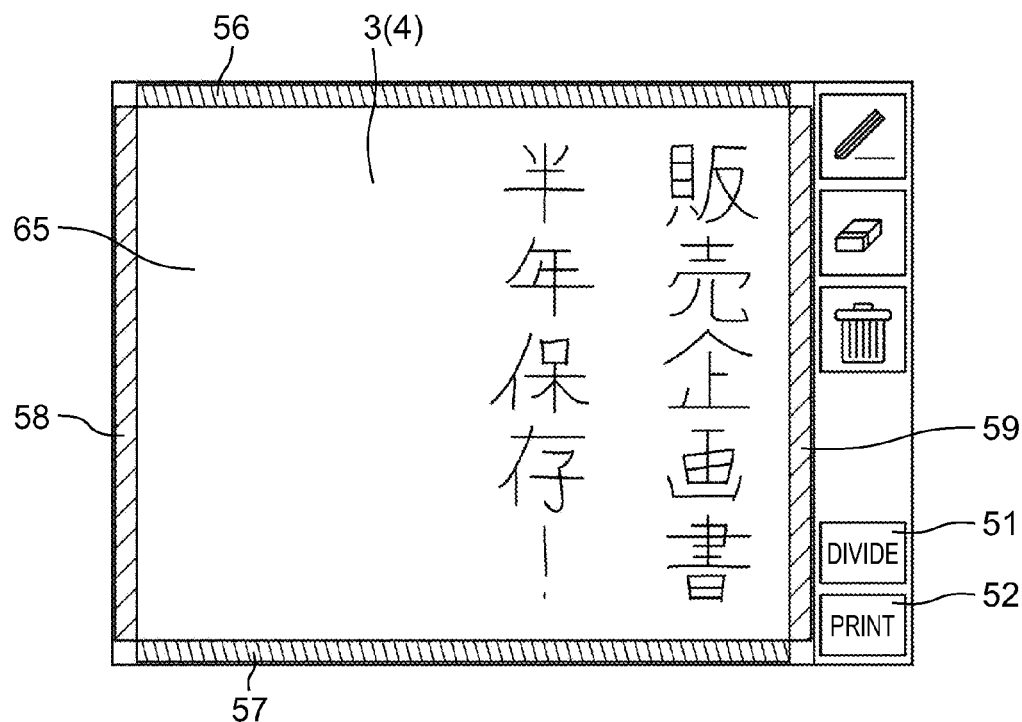

Meanwhile, the input of the characters is not limited to horizontal writing illustrated in FIG. 6 and FIG. 7A. As illustrated in FIG. 7B, the characters may be written vertically like "keep sales plan (line feed) for half year!" in order to perform printing by division into two labels. Additionally, the Japanese characters of "販売企画書" and "半年 保存 !" in FIG. 7B indicated "keep sales plan (line feed) for half year!" in English. Generally, sometimes characters may be written in the vertical direction in Asia.

Next, when a user touches the division icon 51, the control unit 40 executes a process of switching a mode from the drawing mode to a division mode (step S105).

Figure 8A:
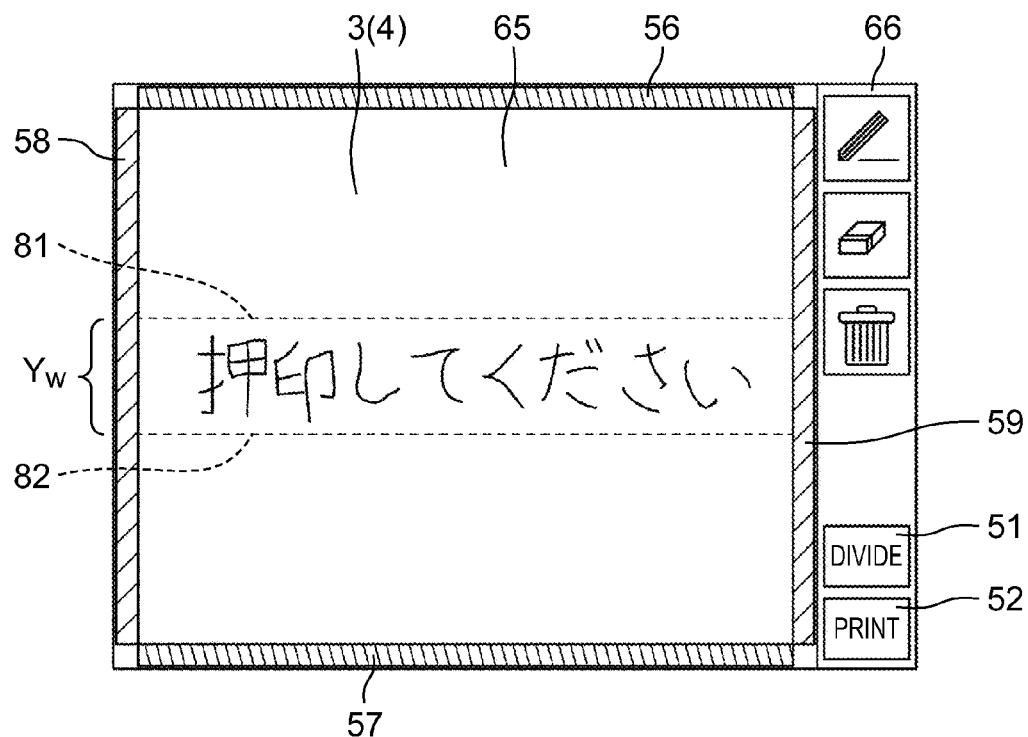
FIGS. 8A and 8B illustrate an example in which division designation lines are input in the printer according to the first embodiment of the present invention.

In the division mode, at the time of the horizontal writing illustrated in FIG. 7A, when a user inputs one continuous handwriting line (division designation line) above characters so as to connect the left division line position detection region 58 and the right division line position detection region 59 to each other with the characters interposed therebetween, the control unit 40 displays the handwriting line as a division designation line in the drawing input detection region 65. In addition, when the horizontal direction of the drawing input detection region 65 is set to as an X-axis and the vertical direction thereof is set as a Y-axis, the control unit 40 calculates an average value $y_{m1}$ of Y coordinates between a touch start point and a touch end point and displays a straight line satisfying the relation of $Y=y_{m1}$ by a broken line as a division line 81 in the drawing input detection region 65, as illustrated in FIG. 8A. Similarly, when a user inputs one continuous handwriting line below characters so as to connect the left division line position detection region 58 and the right division line position detection region 59 to each other with the characters interposed therebetween, the control unit 40 calculates an average value $y_{m2}$ of Y coordinates between a touch start point and a touch end point and displays a straight line satisfying the relation of $Y=y_{m2}$ by a broken line as a division line 82 in the drawing input detection region 65. At this time, a value of $y_{m1}-y_{m2}$ is set to a label width $Y_w$.

On the other hand, as illustrated in FIG. 7B, in a case of characters written vertically in two rows, when a user inputs a handwriting line between the two rows of characters or on the left side of the left characters so as to connect the upper division line position detection region 56 and the lower division line position detection region 57 to each other to partition the two rows of characters, the control unit 40 displays the division line 81 or the division line 82 by a broken line in the drawing input detection region 65 on the basis of the handwriting line, in a similar manner to the above-described manner. In this case, label widths are $X_{1w}$ and $X_{2w}$, respectively. The above-described series of processes are a drawing process (step S110) of a division line.

In step S110, instead of drawing the division line on the basis of the above-described average value, a straight line which passes through a touch position on the upper division line position detection region 56 or the lower division line position detection region 57 and which is perpendicular to the division line position detection region 56 or the division line position detection region 57 may be drawn as the division line, or a straight line which passes through a touch position on the left division line position detection region 58 or the right division line position detection region 59 and which is perpendicular to the division line position detection region 58 or the division line position detection region 59 may be drawn as the division line.

As stated above, in the division mode, the control unit 40 regards the input to the input unit 4 as input for division line setting rather than as input of data to be printed on a label (label printing data).

Next, when the user touches the division icon 51 again, the control unit 40 switches the mode from the division mode to a drawing mode. That is, the user can perform toggle switching between the drawing mode and the division mode by touching the division icon 51. In either the drawing mode or the division mode, when the printing icon 52 is touched (printing execution operation; step S120), an operation mode transitions to a printing mode, and the control unit 40 starts a printing process.

When the printing process is started, first, the control unit 40 detects a direction of a division line that is set. When the division line is in a horizontal direction, the control unit detects a region to which label printing data is input among a region between the adjacent division lines, a region between the division line and the upper division line position detection region 56, and a region between the division line and the lower division line position detection region 57, and sets the region to which the label printing data is input, as a valid region. In this case, the number of valid regions may be two or more. This process is a data detection process (step S135). As stated above, in this embodiment, the control unit 40 functions as a valid region setting unit.

For example, as illustrated in FIG. 8A, the control unit 40 sets a region between two division lines 81 and 82 as a valid region and performs a printing target setting process (step S140) in which characters of "please stamp" within the valid region are set as a target to be printed on one label. As stated above, in this embodiment, the control unit 40 functions as a partition region setting unit.

Next, the control unit 40 performs a longitudinal direction determination process (step S142) in which a horizontal direction is regarded as a longitudinal direction because of the division lines 81 and 82 being in the horizontal direction. In addition, the control unit 40 may determine the longitudinal direction of the valid region on the basis of an aspect ratio of the valid region. As stated above, in this embodiment, the control unit 40 functions as a longitudinal direction determination unit.

Next, the control unit 40 performs a magnification determination process (step S145) in which a magnification at the time of enlarging or reducing the size of the entire label printing data (a drawing) is determined, while maintaining an aspect ratio so that the label width $Y_W$ of the printing region illustrated in FIG. 8A conforms to a tape width of the installed tape member 31 which is a printing medium. As stated above, in this embodiment, the control unit 40 functions as a magnification determination unit.

Here, in the example illustrated in FIG. 8A, since the longitudinal direction detected in the longitudinal direction determination process is a horizontal direction, the control unit 40 does not perform a process of rotating the label printing data within the valid region. The control unit 40 controls the printer control unit 109 to perform a printing process (step S150). In the printing process, the label printing data which is enlarged or reduced in size in accordance with the magnification determined in the magnification determination process is printed on the printing medium by the printer unit 110. Thus, for example, in a case of the label printing data being written horizontally, even when a large margin portion having no data input thereto is present above and below the label printing data within the drawing input detection region 65, printing is performed so that the margin portion is not included in the printing data by a user's operation, and thus it is possible to print, on a label, the label printing data as characters having an appropriate size with respect to a label width, as illustrated in FIG. 9.

On the other hand, a case where the direction of the detected division line is a vertical direction in the above-described data detection process will be described. In this case, the control unit 40 detects a region to which the label printing data is input among a region between the adjacent division lines, a region between the division line and the left division line position detection region 58, and a region between the division line and the right division line position detection region 59, and sets the region to which the label printing data is input, as a valid region (data detection process, step S135).

Figure 8B:
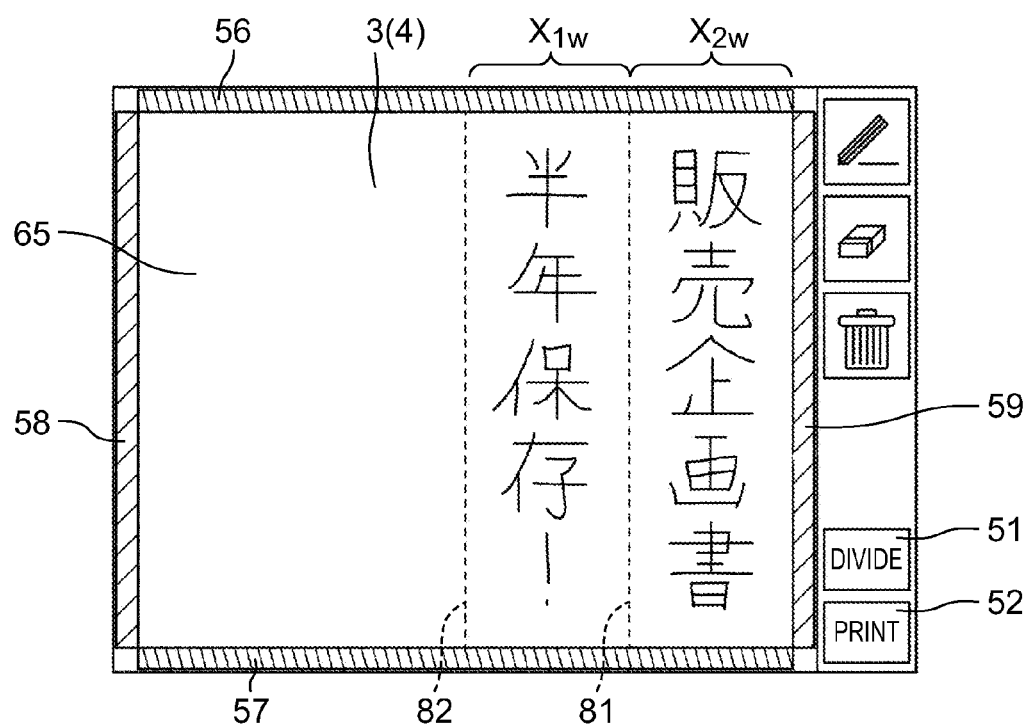

As illustrated in FIG. 8B, in a case where the number of regions partitioned by division lines is two or more, the control unit 40 performs the above-described data detection process for each region. That is, the control unit 40 sets a region between two division lines 81 and 82 as a first valid region, sets characters of "keep for half year!" within the first valid region as a target to be printed on one label, sets a region between the division line 81 and the right division line position detection region 59 as a second valid region, and sets characters of "sales plan" within the second valid region as a target to be printed on another label (printing target setting process, step S140).

Next, the control unit 40 performs the longitudinal direction determination process (step S142) in which a vertical direction is regarded as a longitudinal direction because of the division lines 81 and 82 being in the vertical direction. In addition, the control unit 40 may determine the longitudinal direction of the valid region on the basis of an aspect ratio of the valid region. As stated above, in this embodiment, the control unit 40 functions as a longitudinal direction determination unit.

Next, the control unit 40 performs a magnification determination process (step S165) in which a magnification at the time of enlarging or reducing the size of the entire label printing data, while maintaining an aspect ratio so that the width $X_{1w}$ of the printing region illustrated in FIG. 8B conforms to a tape width of the installed tape member 31 which is a printing medium. As stated above, in this embodiment, the control unit 40 functions as a magnification determination unit.

In the example illustrated in FIG. 8B, since the longitudinal direction detected in the longitudinal direction determination process is not a horizontal direction, next, the control unit 40 executes a data rotation process (step S170) in which the label printing data, rotated counterclockwise at 90 degrees while maintaining the aspect ratio thereof, within two valid regions is expanded within a printing buffer. In this case, the rotation direction may be a clockwise direction. In addition, the rotation angle is not limited to 90 degrees, and the data may be rotated by an angle between the longitudinal direction of the valid region and the longitudinal direction of the input detection region.

The control unit 40 controls the printer control unit 109 to perform the printing process (step S150). In the printing process, the label printing data which is enlarged or reduced in size in accordance with the magnification determined in the magnification determination process is printed on the printing medium by the printer unit 110. Thus, for example, in a case of the label printing data being written vertically, instead of printing the label printing data along the width direction of a label, printing is performed after rotating the entirety of the label printing data at 90 degrees so that the right and left margin portions of the label printing data are not included in the printing data by a user's operation, and thus it is possible to print, on the label, the label printing data as characters having an appropriate size with respect to the label width, as illustrated in FIG. 9.

In the above-described first embodiment, as illustrated in FIG. 8B, when a plurality of columns of label printing data are desired to be printed by being divided into a plurality of labels, the division designation line on the right side of the right label printing data is omitted without being drawn, and only one division designation line between the right and left label printing data is drawn. However, one handwriting division designation line may be drawn for each of the right and left sides of each label printing data. That is, two handwriting division designation lines may be drawn for each label printing data.

In the division mode, the division designation line determines the division line on the basis of the handwriting division designation line connecting the upper and lower division line position detection regions 56 and 57 or the left and right division line position detection regions 58 and 59, but the present invention is not limited thereto. For example, the control unit 40 may draw a straight line, which passes through a touch position at which a user touches any place within the division line position detection regions 56, 57, 58, and 59 displayed on a peripheral edge of the input unit 4 and which is parallel to the vertical direction, or a straight line parallel to the horizontal direction. The control unit may use the straight line as a division line.

In this case, instead of providing the division line position detection region on all sides, the division line position detection region may be provided at only two places corresponding to two adjacent sides of the input unit 4, for example, the upper and left sides of the drawing input detection region 65. In addition, the division line position detection region may be provided at three places corresponding to three adjacent sides of the input unit 4 from the viewpoint of user friendliness.

Further, in this modified example, the division line may be set to be movable by touching again the division line position detection region or a division line that is drawn in advance, and the position of the division line may be set to be finely adjustable in a vertical direction and a horizontal direction.

In addition, in the above-described first embodiment, the division line is a straight line in setting a valid region, but the present invention is not limited thereto. Hereinafter, a second embodiment regarding a case where a division line is a curved line will be described.

Figure 10A:
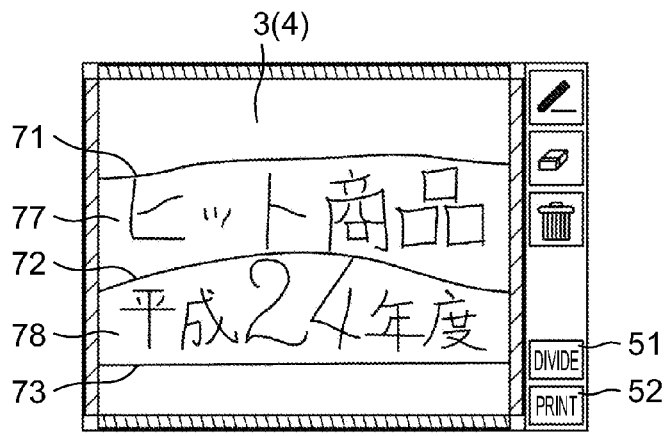
FIGS. 10A to 10C illustrate another example in which label characters of cross-wise writing are input by handwriting in a printer according to a second embodiment of the present invention.
Figure 10B:
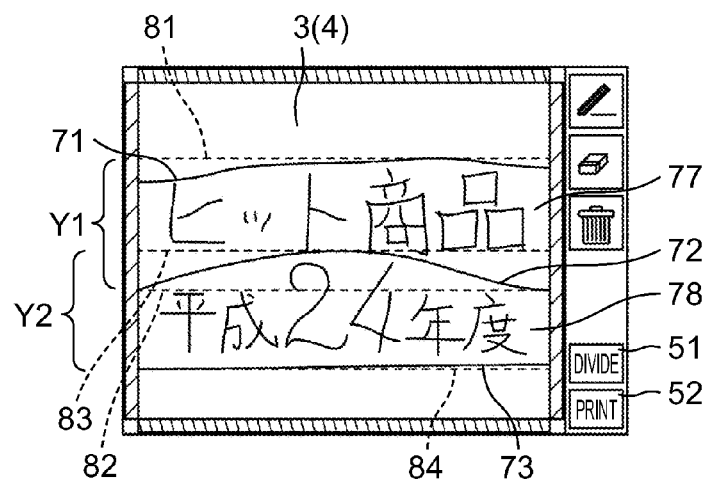

In the second embodiment, as illustrated in FIG. 10A, when two stages of character strings for a label are written by horizontal writing, characters of one character string are changed in size. In addition, in a case where a division designation line is drawn as a curved line so as to divide the character strings, the entire range partitioned by the curved division designation line is set as a valid region, and a magnification at the time of enlarging or reducing the size of the entire label printing data is determined while maintaining an aspect ratio so that a width of a portion, having the maximum amount of protrusion along the vertical direction, of the division designation line in the valid region conforms to a tape width.

In this case, in the division mode, as illustrated in FIG. 10A, a user inputs handwriting curved lines having a touch start point in a left division line position detection region 58 and a touch end point in a right division line position detection region 59 as handwriting division designation lines 71, 72, and 73. Thus, a drawing input detection region 65 is partitioned into four regions, and two regions having characters input thereto are set as valid regions 77 and 78 by a control unit 40.

Figure 10C:
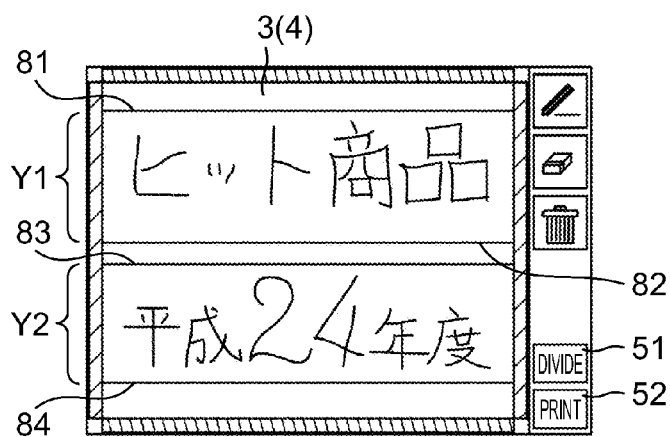

A straight line, which passes through a point, having the maximum amount of upward-protrusion, of the handwriting division designation line 71 defining an upper boundary of one valid region 77 and which is parallel to a horizontal direction, that is, a straight line satisfying the relation of $Y=y_{max}$ when the Y coordinate of the point is set to $y_{max}$ is set as a division line 81. Similarly, a straight line, which passes through a point, having the maximum amount of downward-protrusion, of the handwriting division designation line 72 defining an upper boundary of the valid region 77 and which is parallel to the horizontal direction, that is, a straight line satisfying the relation of $Y=y_{min}$ when the Y coordinate of the point is set to $y_{min}$ is set as a division line 82. Thus, as illustrated in FIG. 10C, a rectangular label region, having a vertical width being $Y_1$, which has characters drawn in a region interposed between the handwriting division designation lines 71 and 72 as label printing data and has a margin above and below the data is set by the control unit 40. Thus, a rectangular region including the entire valid region 77, that is, a region surrounded by left and right division line position detection regions 58 and 59 and the division lines 81 and 82 in FIG. 10C is set as a label region.

Similarly, in another valid region 78, division lines 83 and 84 are set on the basis of the upper and lower handwriting division designation lines 72 and 73. Thus, as illustrated in FIG. 10C, a rectangular label region, having a vertical width being $Y_2$, which has characters drawn in a region interposed between the handwriting division designation lines 72 and 73 as label printing data and has a margin above and below the data is set by the control unit 40. Thus, a rectangular region including the entire valid region 78, that is, a region surrounded by left and right division line position detection regions 58 and 59 and the division lines 83 and 84 in FIG. 10C is set as a label region.

Next, the control unit 40 performs a magnification determination process in which a magnification at the time of enlarging or reducing the size of the entirety of each label printing data is determined, while maintaining an aspect ratio so that label widths $Y_1$ and $Y_2$ of a printing region illustrated in FIG. 10C conform to a tape width of an installed tape member 31 which is a printing medium. Further, the control unit 40 controls a printer control unit 109 to perform a printing process. In the printing process, the label printing data which is enlarged or reduced in size in accordance with the magnification determined in the magnification determination process is printed on the printing medium by the printer unit 110.

In the second embodiment, even in a case where Y coordinates of drawing ranges of two label printing data partially overlap each other, it is possible to create a label having only data, as label printing data, which is drawn within a region surrounded by the division line position detection regions and the handwriting division designation lines and having a margin above and below the data.

Similarly in the first embodiment, one handwriting division designation line may be drawn for each of the upper and lower sides of each label printing data. That is, two handwriting division designation lines may be drawn for each label printing data.

As described above, according to the present invention, for example, in a case of the label printing data being written horizontally, even when a large margin portion having no data input thereto is present above and below the label printing data within the drawing input detection region, printing is performed so that the margin portion is not included in the printing data by a user's operation, and thus it is possible to print, on a label, the label printing data as characters having an appropriate size with respect to a label width.

Further, according to the present invention, for example, in a case of the label printing data being written vertically, instead of printing the label printing data along the width direction of a label, printing is performed after rotating the entirety of the label printing data at 90 degrees so that the right and left margin portions of the label printing data are not included in the printing data by a user's operation, and thus it is possible to print, on the label, the label printing data as characters having an appropriate size with respect to the label width.

In addition, according to the present invention, a straight line which passes through a touch position on the upper division line position detection region 56 or the lower division line position detection region 57 and which is perpendicular to the division line position detection region 56 or the division line position detection region 57 may be drawn as the division line, or a straight line which passes through a touch position on the left division line position detection region 58 or the right division line position detection region 59 and which is perpendicular to the division line position detection region 58 or the division line position detection region 59 is drawn as the division line, and thus the division designation line can be easily input.

Further, according to the present invention, division line position detection regions are provided along two adjacent sides or three adjacent sides of a drawing input detection region, and thus it is possible to input a division line and to secure the wide drawing input detection region.

In addition, according to the present invention, even in a case where Y coordinates of drawing ranges of two label printing data partially overlap each other, it is possible to create a label having only data, as label printing data, which is drawn within a region surrounded by division line position detection regions and handwriting division designation lines and having a margin above and below the data.

Although some embodiments of the present invention have been described above, those embodiments are described as examples, and do not intend to limit the scope of the invention. Those novel embodiments may be embodied in other various modes, and may be variously omitted, substituted, and modified without departing from the scope of the invention. Those embodiments and modification thereof are within the scope and the gist of the invention, and are within the scope of the invention described in the scope of claims and the equivalent thereof.

The processes shown in the flowcharts in the embodiments are applicable to various devices by writing them on a storage medium such as a magnetic disc, optical disc, and semiconductor memory as programs that can be realized by a computer. Alternatively, they are applicable to various devices through communication media transfer. The same operations and effects as in the case of using the device of the embodiments can be obtained by storing the processes described in the embodiments in a desired storage medium and executing the programs on another computer or the like. Here, the computer is not limited to a computer installed in the device described in the embodiments and can be any computer capable of reading the programs stored in a storage medium and including a computation device such as a CPU executing control operation according to the read programs.

What is claimed is:

1. A data processing device comprising:
an input unit that includes an input detection region;
a detection unit that detects a position of an input to the input detection region of the input unit;
a partition region setting unit that partitions the input detection region of the input unit into at least one partition region;
a valid region setting unit that sets, from among said at least one partition region partitioned by the partition region setting unit, a partition region in which an input is detected as a valid region;
a longitudinal direction determination unit that determines a longitudinal direction of the valid region;
a magnification determination unit that determines a magnification for enlarging or reducing a size of a drawing corresponding to the input in the valid region, the magnification being determined such that a width along a direction perpendicular to the longitudinal direction of the valid region conforms to a width along a transverse direction of a printing medium; and
a data rotation unit that, in a case in which the longitudinal direction of the valid region which is determined by the longitudinal direction determination unit is different from a longitudinal direction of the input detection region, rotates the drawing by an angle between the longitudinal direction of the valid region and the longitudinal direction of the input detection region.

2. The data processing device according to claim 1, wherein the input detection region of the input unit has a shape with a side,
wherein the input unit further includes a division line position detection region which is a region to which a starting point of a division line is input and which is provided along the side of the input detection region at a peripheral edge thereof, and
wherein the partition region setting unit sets, as the division line, a straight line which passes through a position of an input to the division line position detection region and which is perpendicular to the side of the input detection region.

3. The data processing device according to claim 2, wherein the input detection region of the input unit has a rectangular shape, and
wherein the division line position detection region is provided along two adjacent sides of the input detection region.

4. The data processing device according to claim 1, wherein the input detection region of the input unit has a rectangular shape,
wherein the partition region setting unit sets the partition region so that at least a portion of the partition region is defined by a handwriting input line drawn between two sides facing each other of the input detection region from one side to the other side, and
wherein the valid region setting unit sets, from among said at least one partition region set by the partition region setting unit, the partition region in which the input is detected as a valid region and further sets a rectangular region including an entirety of the valid region as a label region.

5. A printer comprising:
an input unit that includes an input detection region;
a detection unit that detects a position of an input to the input detection region of the input unit;
a partition region setting unit that partitions the input detection region of the input unit into at least one partition region;
a valid region setting unit that sets, from among said at least one partition region partitioned by the partition region setting unit, a partition region in which an input is detected as a valid region;

a longitudinal direction determination unit that determines a longitudinal direction of the valid region;
a magnification determination unit that determines a magnification for enlarging or reducing a size of a drawing corresponding to the input in the valid region, the magnification being determined such that a width along a direction perpendicular to the longitudinal direction of the valid region conforms to a width along a transverse direction of a printing medium;
a printer unit that prints, on the printing medium, the drawing which is enlarged or reduced in size in accordance with the magnification; and
a data rotation unit that, in a case in which the longitudinal direction of the valid region which is determined by the longitudinal direction determination unit is different from a longitudinal direction of the input detection region, rotates the drawing by an angle between the longitudinal direction of the valid region and the longitudinal direction of the input detection region.

6. A non-transitory computer readable medium having a data processing program stored thereon, the data processing program being executable to control a data input device that includes an input unit having an input detection region and a detection unit detecting a position of an input to the input detection region of the input unit to perform functions comprising:
partitioning the input detection region of the input unit into at least one partition region;
setting, from among said at least one partition region, a partition region in which an input is detected as a valid region;
determining a longitudinal direction of the valid region;
determining a magnification for enlarging or reducing a size of a drawing corresponding to the input in the valid region, the magnification being determined such that a width along a direction perpendicular to the longitudinal direction of the valid region conforms to a width along a transverse direction of a printing medium; and
rotating, in a case in which the longitudinal direction of the valid region determined in the determining is different from a longitudinal direction of the input detection region, the drawing by an angle between the longitudinal direction of the valid region and the longitudinal direction of the input detection region.

7. A data processing device comprising:
an input unit that includes an input detection region;
a detection unit that detects a position of an input to the input detection region of the input unit;
a partition region setting unit that partitions the input detection region of the input unit into at least one partition region;
a valid region setting unit that sets, from among said at least one partition region partitioned by the partition region setting unit, a partition region in which an input is detected as a valid region;
a longitudinal direction determination unit that determines a longitudinal direction of the valid region; and
a magnification determination unit that determines a magnification for enlarging or reducing a size of a drawing corresponding to the input in the valid region, the magnification being determined such that a width along a direction perpendicular to the longitudinal direction of the valid region conforms to a width along a transverse direction of a printing medium;
wherein:
the input detection region of the input unit has a rectangular shape;
the input unit further includes a division line position detection region which is a region to which a starting point of a division line is input and which is provided along a peripheral edge of two adjacent sides of the input detection region; and
the partition region setting unit sets, as the division line, a straight line which passes through a position of an input to the division line position detection region and which is perpendicular to a side of the input detection region at which the input to the division line position detection region is input.

8. A printer comprising:
an input unit that includes an input detection region;
a detection unit that detects a position of an input to the input detection region of the input unit;
a partition region setting unit that partitions the input detection region of the input unit into at least one partition region;
a valid region setting unit that sets, from among said at least one partition region partitioned by the partition region setting unit, a partition region in which an input is detected as a valid region;
a longitudinal direction determination unit that determines a longitudinal direction of the valid region;
a magnification determination unit that determines a magnification for enlarging or reducing a size of a drawing corresponding to the input in the valid region, the magnification being determined such that a width along a direction perpendicular to the longitudinal direction of the valid region conforms to a width along a transverse direction of a printing medium; and
a printer unit that prints, on the printing medium, the drawing which is enlarged or reduced in size in accordance with the magnification;
wherein:
the input detection region of the input unit has a rectangular shape;
the input unit further includes a division line position detection region which is a region to which a starting point of a division line is input and which is provided along a peripheral edge of two adjacent sides of the input detection region; and
the partition region setting unit sets, as the division line, a straight line which passes through a position of an input to the division line position detection region and which is perpendicular to a side of the input detection region at which the input to the division line position detection region is input.

9. A non-transitory computer readable medium having a data processing program stored thereon for controlling a data input device, wherein the data input device includes an input unit including (i) an input detection region having a rectangular shape, and (ii) a division line position detection region which is a region to which a starting point of a division line is input and which is provided along a peripheral edge of two adjacent sides of the input detection region, and wherein the data processing program is executable to control the data input device to function as units comprising:
a detection unit that detects a position of an input to the input detection region of the input unit,
a partition region setting unit that partitions the input detection region of the input unit into at least one partition region;
a valid region setting unit that sets, from among said at least one partition region partitioned by the partition region setting unit, a partition region in which an input is detected as a valid region;

a longitudinal direction determination unit that determines a longitudinal direction of the valid region; and a magnification determination unit that determines a magnification for enlarging or reducing a size of a drawing corresponding to the input in the valid region, the magnification being determined such that a width along a direction perpendicular to the longitudinal direction of the valid region conforms to a width along a transverse direction of a printing medium;

wherein the partition region setting unit sets, as the division line, a straight line which passes through a position of an input to the division line position detection region and which is perpendicular to a side of the input detection region at which the input to the division line position detection region is input.

* * * * *